UNITED STATES PATENT OFFICE 2,311,288

METHOD OF INCREASING THE PLASTICITY OF PORTLAND CEMENT MIXTURES

Robert Ben Booth, Springdale, Conn., assignor to American Cyanamid Company, New York, N. Y., a corporation of Maine No Drawing. Application May 2, 1940, Serial No. 332,963

8 Claims. (Cl. 106—93)

This invention relates to methods for increasing the plasticity of Portland cement mixtures.

Portland cement mixtures are normally not very plastic, which has required in the past the use of excessive amounts of water over that required for the chemical reaction involved in the setting of concrete in order to produce mixtures of sufficient plasticity for the satisfactory flow. This is objectionable for a number of reasons and produces a concrete which is not as dense as could be obtained if it were possible to have mixtures of satisfactory plasticity by less excess water. Various materials have been tried in the past to increase the plasticity of cement mixes and several classes of compounds have proven to be satisfactory for this purpose. However, the problem is a difficult one because of the fact that the addition of most organic materials to concrete results in a decrease in strength which is, of course, undesirable. The factors entering into the setting of a Portland cement concrete mixtur are very varied and as a result variations in strength of less than 10% are not of any serious consequence and may be considered as falling within the normal variation to be expected.

The present invention is directed to the use of a certain class of compounds which may be referred to as crude fermentation residues for increasing plasticity of Portland cement concrete mixtures. Essentially these residues are those obtained after fermentable carbohydrate materials have been fermented either in the production of alcohols or certain alcoholic beverages. Thus, for example, alcohol is produced by fermentation of black strap molasses. The residue, after fermentation is complete, which is referred to usually as alcohol slops, is often dried and sold under the trade designation of "EMR" which is an abbreviation for "evaporated molasses residue" and this product will be so referred to throughout this specification. Another source of residues is from the fermentation of beer mash to produce a residue which is usually referred to as brewery residues. These may be extracted with water or may be dried and ground.

The chemical composition of the crude fermentation residues is not exactly known as these residues constitute a mixture of a large number of compounds including some carbohydrates, protein materials, and other colloids which are not fermented. While the mixture is not of definite composition and varies to some extent with different plants, for purposes of the present invention the results obtained are strikingly consistent. All of the fermentation residues produce an increased plasticity in Portland cement concrete mixtures but there is a difference between the various residues, dried EMR being far the best product.

Plasticity of cement mixtures is ordinarily measured by the so-called slump test in which a cone of a standard mix is permitted to stand and the reduction in height, or the slump, measured. Compression strength is usually measured after 7 days setting and again after 28 days setting.

The present invention is not limited to exact critical proportions of the fermentation residues. However, it should be understood that if too little is used the increase in slump and plasticity will be inadequate and if the amount becomes excessive serious loss in compression strength is liable to result. The best range is usually from about 0.05 to 0.15% based on the Portland cement.

The invention will be described in greater detail in conjunction with the following specific example.

Example 1

A standard Portland cement mix containing 2041 parts of Portland cement, 6123 parts of clean sand (—8 mesh) and 1210 parts of water were used in making all of the following tests. Three amounts of dried EMR were used, 0.05, 0.10 and 0.15%. A further test was made with 0.10% liquid EMR before drying and three further tests were made with 0.15% of water extract of brewery residues, dried and ground brewery residues and ground wet brewery residues respectively. A control sample of the same cement mix was also tested. This control sample showed a slump of 1.25 inches, a breaking strength of 2835 pounds per square inch after 7 days, and 4170 pounds per square inch after 28 days. The results of the test with the fermentation residues are shown in the following table.

Table

| Material tested | 7 days | | 28 days |
|---|---|---|---|
| | Percent increase in slump[1] | Percent change in compression strength[1] | Percent change in compression strength[1] |
| 0.15% dried EMR | 300 | −2.0 | +17.2 |
| 0.10% dried EMR | 100 | +8.4 | |
| 0.05% dried EMR | 80 | −4.9 | |
| 0.10% liquid EMR | 67 | −5.7 | |
| 0.15% brewery residues—water extract | 33 | −0.3 | |
| 0.15% brewery residues—dried and ground | 62 | −15.3 | −18.1 |
| 0.15% wet brewery residues—ground | 62 | −7.8 | |

[1] Compared to comtrol tests.

It will be apparent from a study of the table that dried EMR shows very marked increase in plasticity with no material change in strength except that after 28 days there is an actual increase in strength with the largest quantity of dried EMR.

When using the liquid or wet residues they have to be incorporated in the Portland cement concrete mix when it is being made. In the case of the dried products, however, it is possible to incorporate them with the cement in dry form so that they are present when at a later time the cement is used in making a concrete mix. This incorporation may, for example, be effected by adding the dry material to the cement clinker before or during grinding.

The dried residue keeps fairly well except that in very damp climates there may be some tendency to mold after considerable time. Very small amounts of antiseptic may be added if desired to prevent any molding. In minute amounts sufficient to prevent molding, the presence of an antiseptic does not have any discernible effect on the plasticizing action of the products or on the strength of the concretes made by them.

What I claim is:

1. A method of increasing the plasticity of a Portland cement mix which comprises adding thereto a small amount of a crude residue obtained after the fermentation of carbohydrate material.

2. A Portland cement having admixed therewith a small amount of a crude residue obtained after the fermentation of carbohydrate material.

3. A Portland cement composition comprising Portland cement having admixed therewith from 0.05 to 0.15% of a crude residue obtained after the fermentation of carbohydrate material.

4. A method of increasing the plasticity of a Portland cement mix which comprises adding thereto a small amount of EMR.

5. A Portland cement having admixed therewith a small amount of EMR.

6. A Portland cement composition comprising Portland cement having admixed therewith from 0.05 to 0.15% of EMR.

7. A method of increasing the plasticity of a Portland cement mix comprising Portland cement, aggregate and water which comprises adding thereto from 0.05 to 0.15% of a crude residue obtained after the fermentation of carbohydrate material, said percentage being based on the amount of Portland cement in the mixture.

8. A method of increasing the plasticity of a Portland cement mix comprising Portland cement, aggregate and water which comprises adding thereto from 0.05 to 0.15% of EMR, said percentage being based on the amount of Portland cement in the mixture.

ROBERT BEN BOOTH.